United States Patent [19]

Doniat

[11] 4,126,733
[45] Nov. 21, 1978

[54] ELECTROCHEMICAL GENERATOR COMPRISING AN ELECTRODE IN THE FORM OF A SUSPENSION

[75] Inventor: Denis Doniat, Paris, France

[73] Assignee: Sorapec Societe de Recherches et d'Application Electronchimiques, Paris, France

[21] Appl. No.: 826,700

[22] Filed: Aug. 22, 1977

Related U.S. Application Data

[63] Continuation of Ser. No. 685,069, May 10, 1976, abandoned.

[51] Int. Cl.² .......................................... H01M 8/08
[52] U.S. Cl. ...................................... 429/12; 429/15; 429/27
[58] Field of Search .................. 429/12, 15, 27, 29

[56] References Cited

U.S. PATENT DOCUMENTS

| | | | |
|---|---|---|---|
| 3,294,586 | 12/1966 | LeDuc | 429/11 |
| 3,551,207 | 12/1970 | Herbst | 429/14 |
| 3,703,446 | 11/1972 | Haycock | 429/12 |

*Primary Examiner*—Anthony Skapars
*Attorney, Agent, or Firm*—Larson, Taylor and Hinds

[57] ABSTRACT

A separator free electrochemical generator wherein one of the electrodes, particularly the anode, is formed of a particulate active material suspended within an electrolyte and which comprises means for causing the circulation of the suspension formed within the corresponding electrode compartment in contact with a current collector, wherein further the active material forms a coating on cores formed of an inert material, the separation of the opposite electrode compartments being achieved by the collector itself which is provided with holes having sizes sufficient for authorizing the free passage of the electrolyte, however lower than the size of the inert cores of said particles.

22 Claims, 3 Drawing Figures

ELECTROCHEMICAL GENERATOR COMPRISING AN ELECTRODE IN THE FORM OF A SUSPENSION

This is a continuation, of application Ser. No. 685,069 filed May 10, 1976, now abandoned.

The invention relates to an electrochemical generator of electrical current which comprises at least one pair of electrodes, i.e. at least one cathode and at least one anode in contact with an electrolyte, and in which the active material of at least one of the electrodes is formed of particles dispersed within the electrolyte to form a suspension therein, the electrochemical generator comprising means capable of causing the suspension to be circulated in contact with a current collector formed of a metallic conductor. The production of electrical energy by such generators results from the unloading of the particles of the active material on the current collector upon the contact therewith of said particles when the suspension is circulated along it.

Batteries of the air-zinc type which are operative according to this principle have already been disclosed. They comprise an anodic compartment in which the active material of the anode, particularly zinc, is formed of a powder suspended within the electrolyte, the suspension so formed being circulated at the contact of a current collector, such as a nickel grid located within this compartment. The anodic compartment so formed cooperates electrochemically in a manner known per se, with cathodes, particularly an aircathode which is provided within a distinct cathodic compartment separated from the anodic compartment by means of a separator which allows the passage of ions from one compartment to the other while preventing the electrolyte which is circulated to move across it from the anodic compartment to the cathodic compartment. In an electrochemical generator of this type, this provision appears all the more necessary as the electrolyte which circulates in the anodic compartment carries active particles which would cause a short-circuit within the generator if they were coming into contact with the cathodes.

It is however well known that separators of such type are responsible for rather important internal ohmic losses and accordingly of a corresponding decrease of the voltages available at the terminals of such generators.

One object of the invention is to obviate such drawbacks, more particularly to provide an electrochemical generator of the type in which the active material of one of the electrodes is suspended within the corresponding electrolyte, such generator being however substantially free of separator.

Accordingly a particular object of the invention is to provide a generator of this type which is capable of achieving higher yields than the generators having electrodes in the suspended form of the type known today.

The electrochemical generator of the invention, wherein at least one of the electrodes, particularly the anode is formed of a particulate active material suspended within an electrolyte, and which comprises at least two compartments for electrodes, particularly a cathodic compartment and an anodic compartment, as well as means for causing the circulation of the suspension within the corresponding compartment in contact with a collector, is characterized in that the active material (such as zinc when the electrode under consideration is an anode) forms a coating on cores formed of a material which is inert chemically and electrochemically with respect to the other components of said generator, in that the separation between the said cathodic and anodic compartments is achieved by the collector itself, the latter being provided with holes having sizes sufficient for allowing the free passage of the electrolyte, however lower than the sizes of the inert cores and in that at least a part and preferably the whole space comprised between the collector and the electrode of the opposite compartment is free of any separator.

In a preferred embodiment of the invention, the above said cores are substantially spherical, whereby the coated cores form balls. In the latter preferred instance the holes of the collector have sizes sufficient for allowing the free passage of the electrolyte, however lower than the diameters of the inert substantially spheric cores.

The cores may be of any inert material from the chemical and electrochemical standpoint, as mentioned hereabove. Preferably of course they are made of a material having a density as low as possible. The smaller the density, the easier the causing of their circulation as defined above.

As a result an electrochemical generator is provided in which the active material of one of the electrodes, particularly of the anode, is suspended within the electrolyte and wherein the opposite electrode, notably the cathode, is sheltered from any risk of contact with the active particles which circulate in the opposite compartment, in the absence of any electrochemical separator. The removal of the separator provides an important increase of the outputs of such generator as compared to generators which operate according to the same principle, with the same active material for the electrodes, which are known nowadays.

The other electrode may be provided in an analogous form or may be constituted in any manner known per se. Preferably however it formed of a gas-operated electrode, particularly an air-cathode.

However in a generator according to a preferred embodiment of the invention, particularly a compact generator, the collector cooperating with the suspended electrode is provided close to the opposite electrode, the latter being for instance formed of the porous conductive plate of a gas-electrode or a collector cooperating with another electrode suspended in the electrolyte. If need be non-conductive spacers are provided between said first mentioned collector and said opposite electrode to avoid short circuits due to direct contact whenever necessary, said spacer however substantially not interfering with the free flowing of the electrolyte from one compartment to the other. An appropriate spacer can be formed by a loosely meshed network of fabric formed of insulating fibres.

It has been found that excellent results are obtained with balls the diameters of which range from about 0.3 to about 2 mm, preferably from 0.5 to 1.5 mm, said cores being coated with a film of zinc having thicknesses up to 100 microns, and even more.

Such particulate material is easily regenerable, particularly when resorting to the electrolytic deposition techniques which are well known in the electroplating field. Advantageously recourse is had to the drum-electrolysis. As a matter of fact it is well-known that the zinc material of the anode undergoes an oxidation to form a zincate as a result of the electrochemical reactions which take place in the generators of the type considered during the production of electrical current, the zincate formed then dissolving within the electrolyte under normal operation of said generators. Accordingly it is necessary from times to times to regenerate the suspended material, particularly to form again a new coating of zinc on the cores made of said inert material.

In a further preferred embodiment of the invention a thin deposit of a more electropositive metal, for instance of nickel or of a noble metal, is provided between the cores of the balls and their thin coating. This intermediate deposit of nickel or noble metal is useful for the above said regeneration operations, in order to provide for the conduction of the electrical current of electrolysis, even after the whole zinc coating of said balls has been consumed during the previous operation of the generator. The thickness of the nickel deposit may be limited to that necessary for obtaining a continuous metallic lattice around the cores. This thickness ranges advantageously from about 0.5 to about 5 microns, for instance is of about 1 micron.

In a preferred embodiment of the invention the deposit of nickel is itself coated with a thin film of cadmium, having for instance a thickness of about 1 micron too, the latter film then preventing any destructive attack of the zinc due to the formation of microbatteries between the nickel and zinc metals. The deposits of the nickel and of the cadmium respectively can be performed in any manner known per se, for instance by resorting to the chemical reduction of solutions containing salts of said metals and wherein the inert cores of the balls were previously suspended.

Obviously these deposits may also, particularly as concerns cadmium, be achieved by electrolysis.

The cores themselves of the balls may be formed of any material which is inert chemically and electrochemically as well, for instance of glass or of plastic material.

The collectors may be formed of any grid or plate formed of a conductor material which does not interfere with the electrochemical reaction, such as nickel, these grids or plates being provided with as many holes as possible in order to reduce the internal resistance of the electrochemical generators so contrived to a minimum, it being of course understood that the sizes of these holes must be less than the sizes of the cores of said balls in order that none of the inert cores of these balls passes from one compartment to the opposite, even after their active coatings have been consumed fully by the electrochemical reaction. Obviously the sizes of the holes will depend on the sizes of the balls. For instance they are advantageously of an order of 0.2 mm when the cores of the balls have diameters of the order of 0.5 mm, or of the order of 0.3 to 0.5 mm when the diameters of the cores are approximately 1 mm.

The electrolytes may be those used conventionally in that type of generator, particularly alkaline solutions. In the preferred embodiment where the anode is formed of zinc, the electrolyte is preferably formed of a solution of potassium hydroxide, having for instance a normality of 6N.

The use of suspensions of the type which has been disclosed involves additional advantages. Clogging of the collectors which occurs frequently in the known electrochemical generators operated with suspensions of powdered zinc having fine particle sizes, is prevented efficiently in the generator according to the invention. Would even such clogging accidentally occur it would not be a cause of induction of a destruction of the circulating circuit of the suspension, particularly outside of the compartments of the electrochemical generator owing to a pressure increase therein, because the electrolyte may still flow through the the free interstices within the clogged mass which the balls would then form.

For the purpose of further illustrating the invention in a non limitative manner, a particular embodiment of an electrochemical generator according to the invention will be disclosed thereafter in conjunction with the appended drawings in which.

Figure 1:
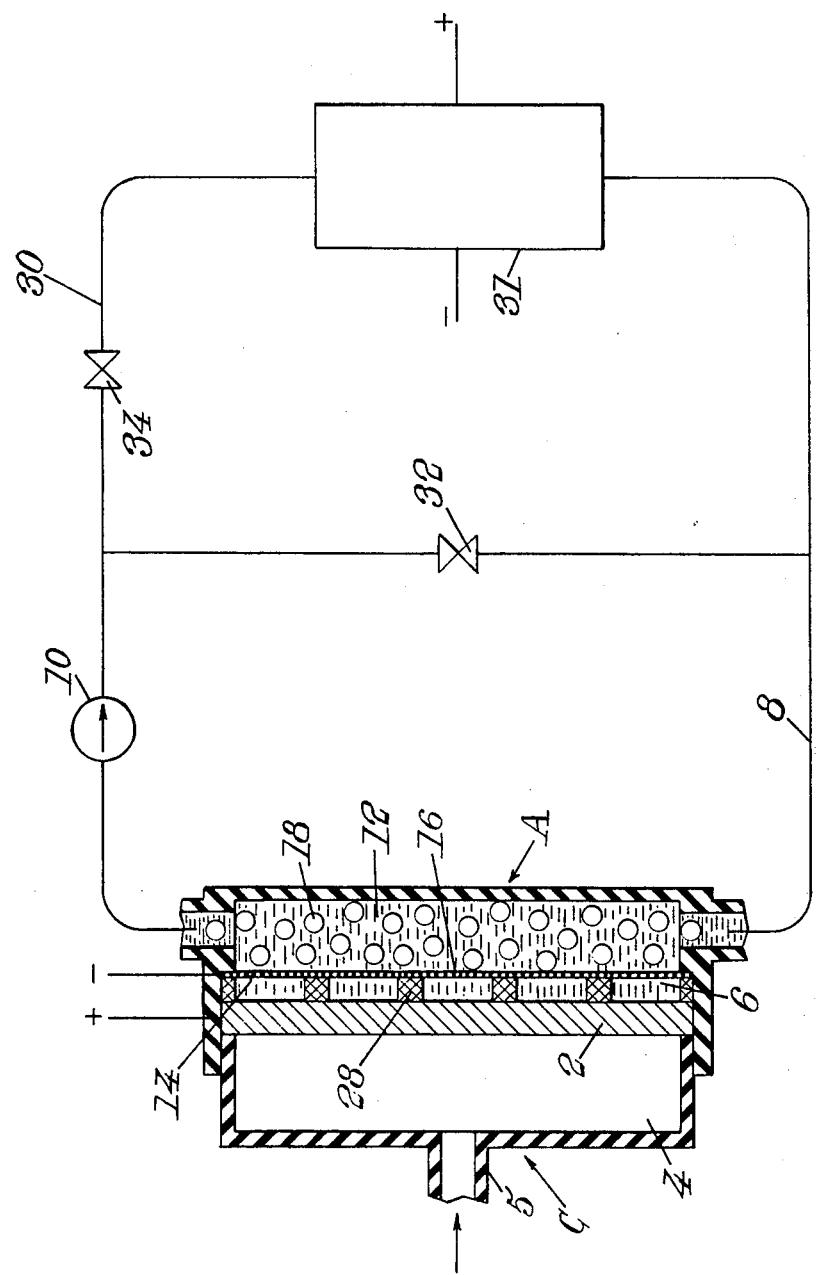
FIG. 1 represents diagrammatically the generator to be described.

In the embodiment shown, the generator is formed of a cell 1 comprising an anodic compartment A and a cathodic compartment C.

The cathodic compartment C comprises a porous air-electrode plate 2, which is connected to the positive terminal of the cell and which divides compartment C into a chamber 4 which is continuously supplied, in 5, with the air supplying the oxygen necessary for the electrochemical reaction, at the level of the cathode, and into a chamber 6 supplied with the electrolyte. In the cathodic compartment so formed, the reaction of electrochemical reduction can then be achieved at the solid-liquid-gaseous interfaces, within the porous electrode plate. The latter can be formed in any manner known per se, for instance of a sintered mixture of nickel and carbon.

The anodic compartment A is associated with an exterior flow circuit 8 comprising a pump 10 capable of causing the circulation of a suspension of the active material of the anode, such as zinc, in a liquid electrolyte, through said circuit 8 and the chamber 12 of compartment A in contact with a collector of current 14 formed of a meshed grid or of a metallic plate perforated with holes 16, of an electrochemically inert metal such as nickel.

In accordance with the invention the active material is in the form of balls 18 which comprise cores made of an inert material coated with an outer layer of the active material itself, notably zinc; the compartments A and C of the generator are separated by means of the collector 14 itself; the holes 16 of this collector have sizes sufficient for enabling the free passage of the electrolyte therethrough, these sizes being however lower than the diameter of the inert cores of the balls. Finally, the space between the collector 14 and the cathode plate 2, in the instant case chamber 6, is essentially free of any separator.

Figure 2:
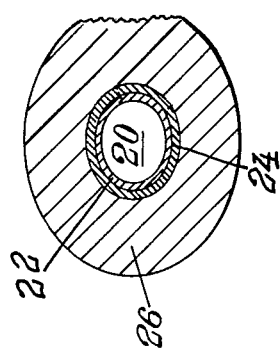
FIG. 2 is a diagrammatic section of an "electrodeball" according to the invention and FIG. 3 is a curve representative of the variation of the electrical current output which can be obtained from a generator of that type as a function of voltage.

The balls which carry the active material are formed advantageously according to FIG. 2 which diagrammatically shows a section of highly enlarged scale thereof (the scales ratios shown being not representative of the actual dimensional ratios of the different parts of the balls).

These balls comprise a core 20 of an inert material (glass or plastic material) coated with a thin continuous layer of nickel 22, itself coated with a thin layer 24 of cadmium, the zinc layer 26 finally coating the cadmium layer.

During operation of the electrochemical generator so formed, the zinc coating dissolves progressively as its electrochemical oxidation proceeds to form a zincate which dissolves in the electrolyte. Because of the relative sizes of the internal cores of the balls, on the one hand, and of the holes or apertures in the collector 14, on the other hand, it will be appreciated that the balls cannot get in touch with the cathode, even when in the "unloaded" state.

Advantageously the transverse dimension of the compartment A is small in order to authorize as many impacts of the balls 18 on the collector 14, for the sake of obtaining a yield of electrochemical oxidation as high as possible.

In the case of generator elements having low thickness, it may be necessary in practice to provide spacer means 28 between the collector 14 and the cathode 2 in order to prevent any short circuit risk between these two elements. These spacer means are advantageously formed of a loosely meshed network formed with artificial fibres, for instance of the polyamid type.

In accordance with one of its preferred embodiments, the generator according to the invention further comprises an additional circuit line 30 by-passing the circulation circuit line 8, and comprising intercalated therein an electrolysis cell referred to generally by the reference Nr. 31 which may be of any type conventionally used in the field of electroplating, for instance an electrolysis cell of the "drum" type. This by-pass enables an easy re-loading or regenerating of the electrode material through electrolysis of the suspension of the "unloaded" balls within the zincate containing electrolytic solution obtained after an extended operation of the generator. Valve members 32 and 34 enable the alternate circulation of of the suspension through either one of the two circuits 8 and 30.

For the sake of further illustrating the invention an example of preparation of balls suitable for the generator under consideration will be described hereafter.

Balls of glass or plastic material, the diameters of which have a value comprised between 0.3 and 2 mm. and preferably between 0.5 and 1.5 mm, are freed of any fats and (in the case of glass balls) subjected to a short attack by hydrochloric acid, then treated with a 20% potassium hydroxide solution at 80° C. for a period of ten minutes, then in a solution of stannous chloride (containing 100 g/l of $SnCl_2$ and 100 ml/l of HCl) for a period of five minutes and finally in a bath of palladium chloride (containing 0.2 g/l of $PdCl^2$ and 100 ml/l of HCl) during a period of two minutes at a temperature of 25° C. The balls are rinsed with water between each of the successive operations mentioned hereabove. The so pre-treated balls are then subjected to a chemical nickel-plating at a temperature of 90° C. within a solution containing 30 g/l of nickel chloride, 10 g/l of sodium citrate, 10 g/l of sodium hypophosphite, and then to an electrochemical cadmium plating within a cyanurated bath. Two superposed layers of nickel and cadmium are thus formed on the glass balls which are continuous though very thin, their thickness ranging from about 0.5 to 5 microns. The zinc coating is then formed by electrolytic zinc deposition within a cyanurated bath or a zincate bath. The electrolytic deposits of cadmium and of zinc may be carried out by any known process usable for particulate products, such as by the "drum electrolytic process".

Figure 3:
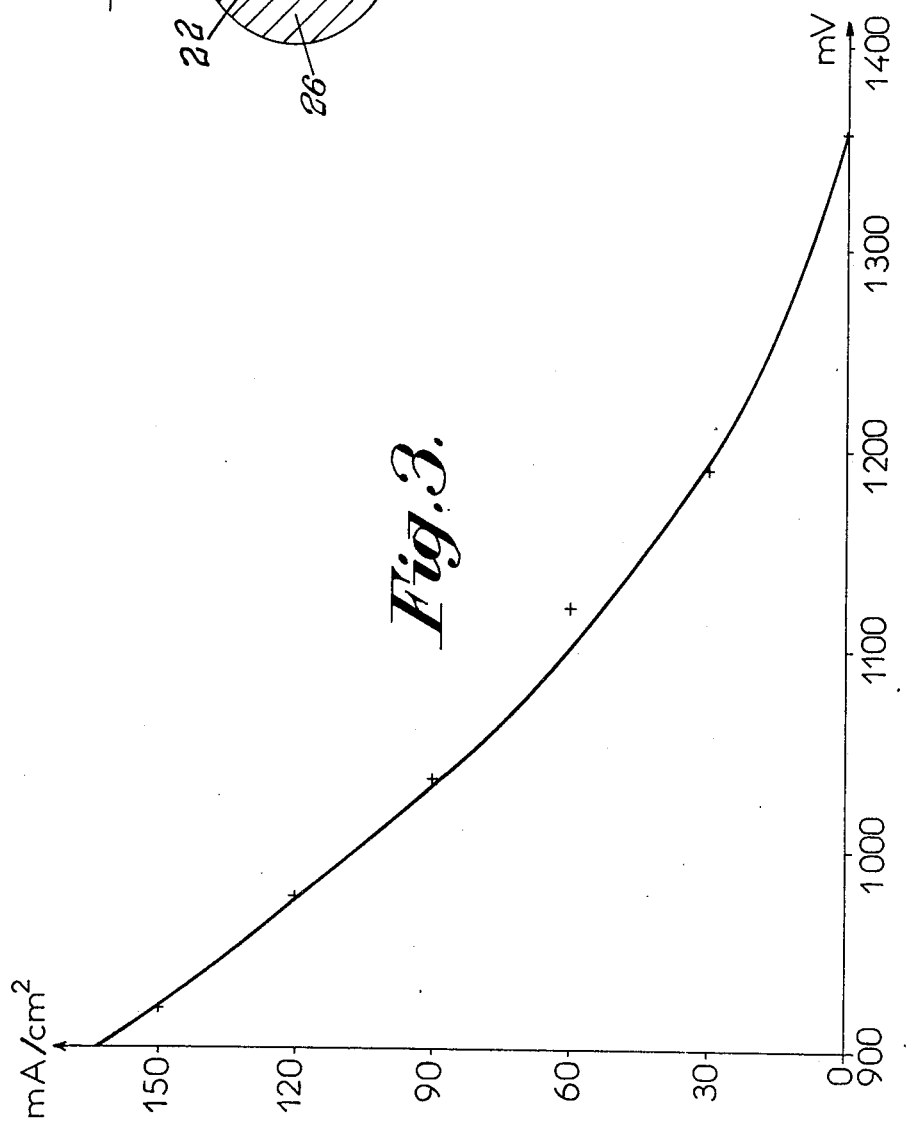

The curve of FIG. 3 is representative of the variation of the density of current I ($mA/cm^2$) as a function of voltage (in mV) which can be produced by a generator such as disclosed hereabove and which comprises:

a conventional air-cathode formed of sintered carbon-nickel a suspension of balls prepared as disclosed hereabove using glass balls having a 1 mm diameter, within an electrolyte formed of a potassium hydroxide solution, a collector formed of a nickel network the meshes of which are of the order of 0.3 mm.

Obviously the invention is not limited to the particular embodiments which have been disclosed hereabove. It embraces all equivalent alternatives; particularly the cathodic compartment could be contrived in any manner known per se or even operate according to a principle analogous to that applied in the anodic compartment, the separation between the cathodic and anodic compartments then being achieved by a double-collector grid, if need be separated by spacing means such as disclosed hereabove in order to avoid short circuit risks between the two collectors.

I claim:

1. In an electro-chemical generator which comprises at least one cathodic compartment, and at least one anodic compartment, a cathode and an anode within said cathodic and anodic compartments respectively, wherein one at least of said electrodes comprises particles suspended within a liquid electrolyte, said particles comprising an active material consumable by an electrochemical reaction upon contact of said particles with a collector of electrical current, means for causing circulation of said suspension of particles with electrolyte within the corresponding compartment in contact with said collector of electrical current, the improvement wherein the generator is free of an electro-chemical separator and contains a free space filled with electrolyte between said current collector and the electrode in the compartment opposite that in which the electrode suspension of particles is circulated, said particles comprise cores of a chemically and electro-chemically inert material having thereon an external coating of said active material, the collector is positioned between the said cathodic and anodic compartments, and is provided with holes having sizes sufficiently large to allow the free passage of the electrolyte from any one of said cathodic and anodic compartments to the other but smaller than the sizes of the inert cores.

2. The generator of claim 1, wherein said cores are substantially spherical and said particles substantially form balls.

3. The generator of claim 2 wherein the electrode which comprises said suspension of particles within the electrolyte is the anode.

4. The generator of claim 3 wherein the active material of the anode is formed of zinc.

5. The generator of claim 4 wherein the electrolyte is formed of a solution of potassium hydroxide.

6. The generator of claim 2 wherein the diameters of the cores range from about 0.3 to about 2mm.

7. The generator of claim 4 wherein the cores are coated with a layer of zinc having a thickness up to about 100 microns or even more.

8. The generator of claim 4 wherein the other electrode in an air-cathode.

9. The generator of claim 3 wherein the active material of the anode is formed of an electrolytically regenerable material.

10. The generator of claim 9 wherein the particles of the anode comprise a layer of a metal more electropositive than the metal of the active material, intermediate between the inert cores of the balls and the external coating of the metal of the active material.

11. The generator of claim 6 wherein the diameters of the cores range from 0.5 to 1.5 mm.

12. The generator of claim 11 wherein the cores are coated with a layer of zinc having a thickness up to about 100 microns.

13. The generator of claim 12 wherein the nickel layer and the zinc coating are separated by an intermediate layer of cadmium.

14. The generator of claim 10 which further comprises a by-pass circuit line containing inserted therein an electrolytic regeneration system of said coating of active material.

15. The generator of claim 1 wherein the other electrode is a gas-electrode.

16. The generator of claim 1 wherein the active material of the electrode which comprises said suspension of particles is an electrically regenerable material.

17. The generator of claim 10 wherein the metal of the active material is zinc and the more electro-positive metal is nickel.

18. The generator of claim 10 wherein the metal of the active material is zinc and the more electro-positive metal is a noble metal.

19. The generator of claim 10 wherein the diameters of the cores range from about 0.3 to about 2 mm.

20. The generator of claim 19 wherein the diameters of the cores range from 0.5 to 1.5 mm.

21. The generator of claim 19 wherein the cores are coated with an external layer of zinc having a thickness up to about 100 microns.

22. The generator of claim 21 wherein the metal of the external coating is zinc, the more electropositive metal is nickel and wherein the nickel layer and the zinc coating are separated by a cadmium layer having a thickness from about 0.5 to about 5 microns.

* * * * *